United States Patent
Kambara

(10) Patent No.: US 6,801,439 B2
(45) Date of Patent: Oct. 5, 2004

(54) MULTIPLE NETWORK ELECTRONIC COMPONENT

(75) Inventor: Shigeru Kambara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 73 days.

(21) Appl. No.: 10/366,255

(22) Filed: Feb. 13, 2003

(65) Prior Publication Data

US 2004/0083074 A1 Apr. 29, 2004

(30) Foreign Application Priority Data

Feb. 15, 2002 (JP) ........................................ 2002-038791

(51) Int. Cl.$^7$ ................................................ H05K 1/16
(52) U.S. Cl. ........................ 361/766; 361/765; 338/320
(58) Field of Search ................................ 361/760–766; 338/312, 320

(56) References Cited

U.S. PATENT DOCUMENTS

| | | | | |
|---|---|---|---|---|
| 3,964,087 A | * | 6/1976 | Mallon | 338/306 |
| 5,334,968 A | * | 8/1994 | Negoro | 338/320 |
| 5,844,468 A | * | 12/1998 | Doi et al. | 338/260 |
| 5,982,273 A | * | 11/1999 | Shibata | 338/320 |

FOREIGN PATENT DOCUMENTS

| | | |
|---|---|---|
| JP | 8-130161 | 5/1996 |
| JP | 2000-348914 | 12/2000 |
| JP | 2000-348915 | 12/2000 |
| JP | 2001-57318 | 2/2001 |
| JP | 2002033203 A | * 1/2002 ............ H01C/7/00 |

\* cited by examiner

*Primary Examiner*—Evan Pert
*Assistant Examiner*—Tuan Dinh
(74) *Attorney, Agent, or Firm*—Merchant & Gould P.C.

(57) ABSTRACT

A multiple network electronic component includes an insulator having a first element-forming surface and a second element-forming surface spaced thicknesswise from the first element-forming surface, a plurality of first intermediate film conductors 20A formed on the first element-forming surface and spaced from each other, a plurality of second intermediate film conductors 20B formed on the second element-forming surface and spaced from each other in corresponding relation to the first intermediate film conductors, and a plurality of through-conductive paths penetrating the insulator for electrically connecting each of the first intermediate film conductors to a corresponding one of the second film conductors. The first element-forming surface is formed with a plurality of first elements and a plurality of second elements, and each of the first and second elements has one end connected to a respective one of the first intermediate film conductors. The second element-forming surface is formed with a plurality of third elements and a plurality of fourth elements, and each of the third and fourth elements has one end connected to a respective one of the second intermediate film conductors.

12 Claims, 9 Drawing Sheets

MULTIPLE NETWORK ELECTRONIC COMPONENT

BACKGROUND OF THE INVENTION

1. Field of the Invention

The present invention relates to a multiple network electronic component.

2. Description of the Related Art

Normally, an electronic circuit for waveform shaping and noise elimination for example comprises two resistors and one capacitor connected in T-configuration where a midpoint between the voltage-dividing resistors is grounded via the capacitor. JP-A-8-130161 proposes reduction of mounting area and simplification of mounting operation in mounting a plurality of such circuits on a mother substrate by integrating these circuits on one surface of a chip substrate. Since each unit circuit includes three elements, the electronic component disclosed in the above document can be fabricated relatively easily by forming a thick-film resistors or a thick-film capacitor on one surface of the chip substrate.

FIG. 11 shows an example of impedance matching circuit for output from an LSI. The circuit includes voltage-dividing resistors arranged between an input and an output terminals, and a midpoint of the resistors is grounded via a capacitor element while also being connected to a logic power supply (Vcc). Recently, there is an increasing tendency for an LSI to have multiple output pins. Consequently, for impedance matching of all the output pins, it is desirable to provide a multiple electronic component which includes a plurality of impedance matching circuits arranged side by side in order to reduce the area occupied by such circuits on the mother substrate while simplifying the mounting operation.

However, since the impedance matching circuit has four elements connected crosswise on equivalent circuits, it is difficult to form a plurality of such circuits arranged side by side on one surface of the substrate by thick-film printing.

SUMMARY OF THE INVENTION

The present invention, which has been conceived under the circumstances described above, aims to provide a multiple network electronic component which includes a plurality of side-by-side circuits each having a crosswise-connected structure in equivalent circuitry, and which can be fabricated at a low cost.

To fulfill the above-mentioned object, the present invention employs the technical measures.

A multiple network electronic component according to the present invention comprises an insulator having a first element-forming surface and a second element-forming surface spaced thicknesswise from the first element-forming surface, a plurality of first intermediate film conductors formed on the first element-forming surface and spaced from each other, a plurality of second intermediate film conductors formed on the second element-forming surface and spaced from each other in corresponding relation to the first intermediate film conductors, and a plurality of through-conductive paths penetrating the insulator for electrically connecting each of the first intermediate film conductors to a corresponding one of the second film conductors. The first element-forming surface is formed with a plurality of first elements and a plurality of second elements. Each of the first and second elements has one end connected to a respective one of the first intermediate film conductors. The second element-forming surface is formed with a plurality of third elements and a plurality of fourth elements. Each of the third and fourth elements having one end connected to a respective one of the second intermediate film conductors.

Preferably, either or all of the first intermediate film conductors, the second intermediate film conductors, the first elements, the second elements, the third elements, and the fourth elements are formed by thick-film printing. Particularly, each of the elements may be suitably formed by thick-film printing. Since each of the first intermediate film conductors on the first element-forming surface is electrically connected to a respective one of the second intermediate film conductors on the second element-forming surface via the through-conductive path, the first to fourth elements are considered to be connected crosswise in equivalent circuitry. Thus, the electronic component may be considered to have a plurality of side-by-side sets of crosswise-connected elements.

According to a preferred embodiment, the first intermediate film conductors and the second intermediate film conductors are formed along a center line of the insulator, and the first elements and the fourth elements are formed on one side of the insulator while the second elements and the third elements are formed on opposite side of the insulator.

With this arrangement, the intermediate film conductor may be easily and efficiently connected to the inner ends of each paired elements on a respective element forming surface in side-by-side relationship with other pairs of elements by thick-film printing.

According to a preferred embodiment, one of each first element and each fourth element has another end connected individually to a respective one of plural terminal electrodes formed at one edge of the insulator while the other of each first element and each fourth element is connected to a common film conductor which is connected to a terminal electrode formed at said one edge of the insulator. Further, one of each second element and each third element has another end connected individually to a respective one of plural terminal electrodes formed at an opposite edge of the insulator while the other of each second element and each third element is connected to a common film conductor which is connected to a terminal electrode formed at said opposite edge of the insulator.

In this case, each of the through-conductive paths preferably has a cross-sectional area which is smaller than a surface area of the respective first or second intermediate film conductor. This leads to an advantageous structure in which one of the first to fourth elements which are connected crosswise is connected to a common ground for example while another of these elements is connected to a common power supply for example.

According to a preferred embodiment, one of each first element, each second element, each third element, and each fourth element connected to the common film conductor is a capacitor, whereas the remaining elements are resistors.

Such an arrangement provides an electronic component which comprises a plurality of impedance matching circuits arranged side by side for output from an LSI for example.

According to another preferred embodiment, one of each first element, each second element, each third element, and each fourth element connected to the common film conductor is a jumper element.

Such an arrangement provides an electronic component which comprises a plurality of side-by-side circuits each including three elements substantially connected in T-shape.

According to a preferred embodiment, the first element-forming surface is provided by an upper surface of a single insulating substrate, whereas the second element-forming surface is provided by a lower surface of the substrate.

This arrangement can contribute to a size reduction of the electronic component as a whole. In this case, each of the through-conductive paths may be a so-called via-hole.

According to another preferable embodiment, the first element-forming surface is provided by one surface of a first insulating substrate while the second element-forming surface is provided by one surface of a second insulating substrate. The first insulating substrate and the second insulating substrate are laminated together.

With this arrangement, the electronic component can efficiently fabricated by steps of separately preparing the first substrate and the second substrate, followed by bonding them together.

In this case, the first insulating substrate and the second insulating substrate may be laminated on each other with the first element-forming surface and the second element-forming surface directed in a same direction. Alternatively, the first insulating substrate and the second insulating substrate may be laminated on each other with the first element-forming surface and the second element-forming surface directed away from each other. Further alternatively, the first insulating substrate and the second insulating substrate may be laminated on each other with the first element-forming surface and the second element-forming surface directed toward each other.

According to the present invention, in any case, there is provided efficiently and at a low cost a multiple network electronic component in which a plurality of side-by-side circuits each including four crosswise-connected elements in equivalent circuitry.

Other objects, features and advantages of the present invention will become clearer from the description of the preferred embodiments given below.

DETAILED DESCRIPTION OF THE PREFERRED EMBODIMENTS

Preferred embodiments of the present invention will be described below in detail with reference to the accompanying drawings.

Figure 1:
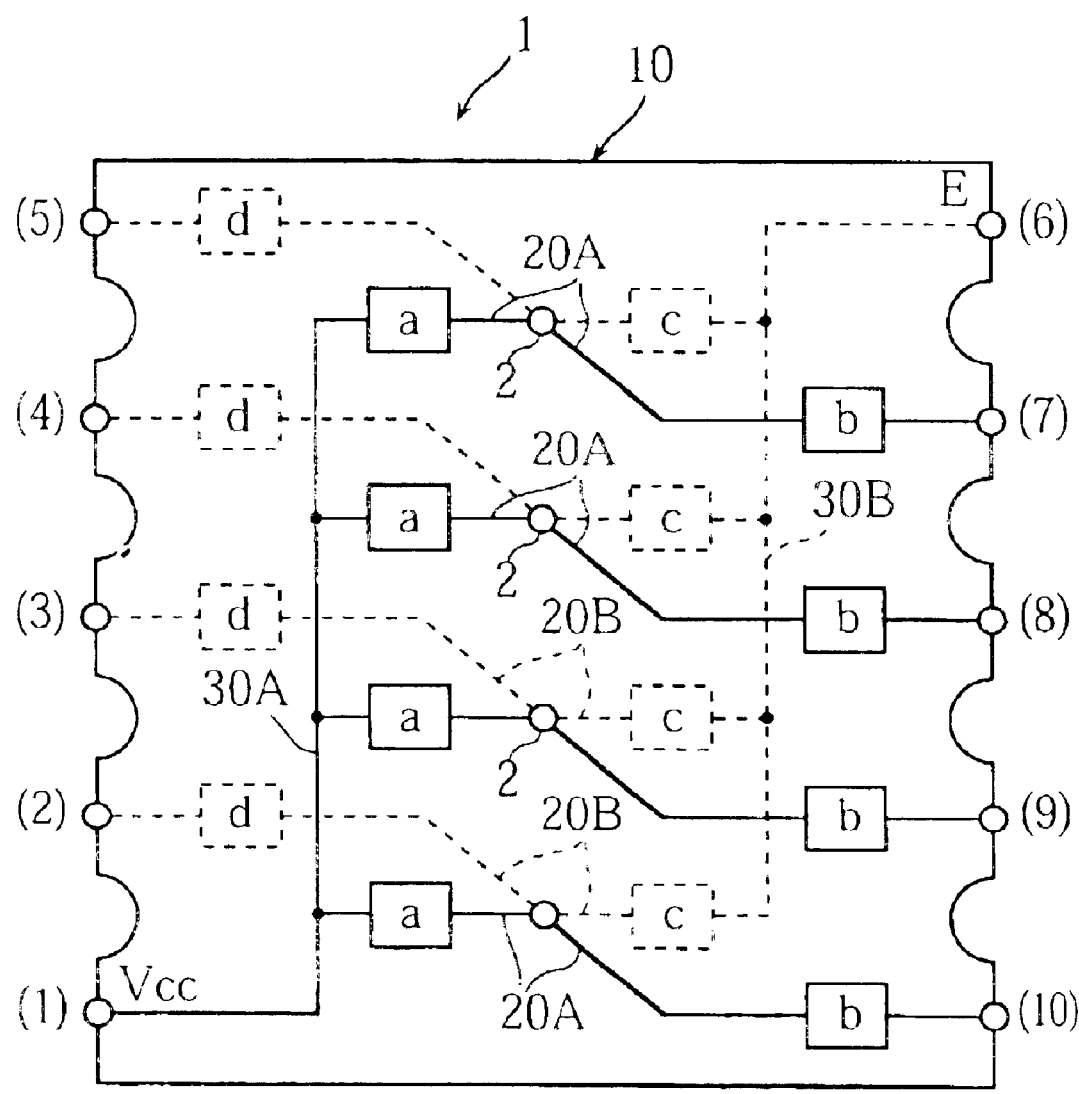
FIG. 1 is a schematic plan view showing a multiple network electronic component according to an embodiment of the present invention.

FIG. 1 is a schematic plan view of a multiple network electronic component according to an embodiment of the present invention for showing the element layout and the wiring pattern on the upper and lower surfaces of a generally rectangular insulating substrate 10 made of an insulating material. In the figure, the elements a, b and wiring pattern represented in solid lines are formed on the upper surface (first element-forming surface) of the insulating substrate 10 while the elements c, d and wiring pattern showed in dotted lines are formed on the lower surface (second element-forming surface) of the insulating substrate 10.

As shown in FIG. 1, the first element a and the second element b form a pair on the upper surface of the insulating substrate 10, and there are four such pairs arranged in the longitudinal direction. In each pair, an inner end of the first element a is connected to an inner end of the second element b via a respective first intermediate film conductor 20A. The third element c and the fourth element d form a pair on the lower surface of the insulating substrate 10, and there are four such pairs arranged in the longitudinal direction in corresponding relation to the pairs of first and second elements a, b. In each pair, an inner end of the third element c is connected to an inner end of the fourth element d via a respective second intermediate film conductor 20B. Each first intermediate film conductor 20A is electrically connected to the corresponding second intermediate film conductor 20B by a respective through-conductive path 2 such as a via-hole penetrating the substrate 10. In the illustrated embodiment, the pairs of intermediate film conductors 20A, 20B and the through-conductive paths 2 for electrically connecting these conductors are arranged along a center line of the substrate 10. The first elements a and the fourth elements d are formed in one region of the substrate 10 on one side of the array of the through-conductive paths 2, while the second elements b and third elements c are formed in another region of the substrate 10 on the other side of the array of the through-conductive paths 2.

On the upper surface of the substrate 10, an outer end of each first element a is connected to a common conductive pattern (wiring pattern) 30A. The conductive pattern 30A is connected to one (1) of plural terminal electrodes (1)(2)(3)(4)(5) formed at one edge of the substrate. An outer end of each second element b is connected individually to a respective one of terminal electrodes (6)(7)(8)(9)(10) formed at the opposite edge of the substrate 10.

On the lower surface of the substrate 10, an outer end of each third element c is connected to a common conductive pattern (wiring pattern) 30B. The conductive pattern 30B is connected to one (6) of the terminal electrodes (6)(7)(8)(9)(10) formed at the above-mentioned opposite edge of the substrate 10. An outer end of each fourth element d is connected individually to the terminal electrodes (5)(4)(3)(2) formed at the above-mentioned one edge of the substrate 10. Further, in this embodiment, the terminal electrodes (1)–(10) at both side edges of the substrate 10 are formed on projections at both side edges of the substrate.

The wiring pattern, the elements, the terminal electrode, and the conductive path 2 can be easily formed on the substrate 10 by a known thick-film forming method, as more specifically described hereinafter.

Figure 2:
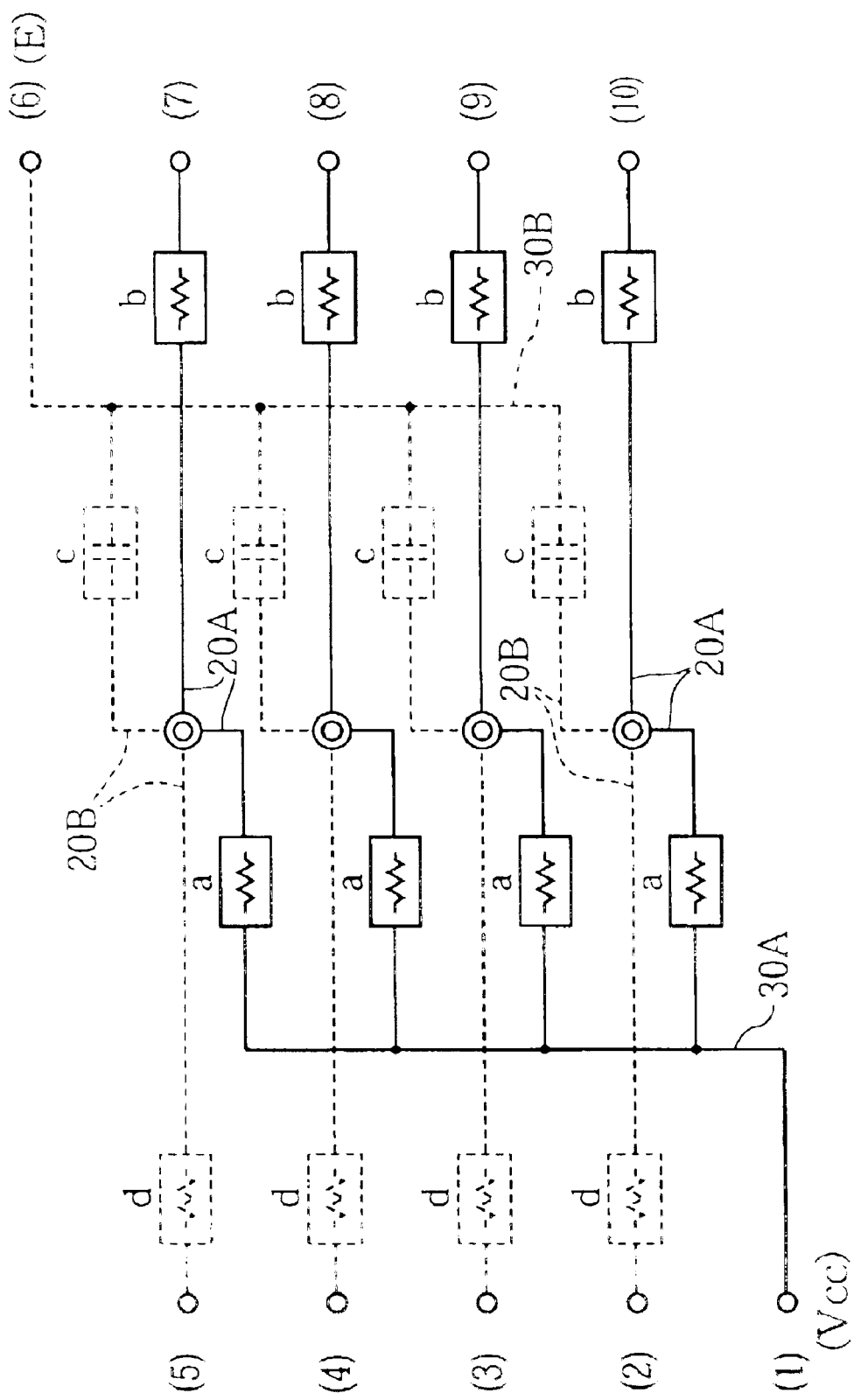
FIG. 2 is a modified schematic view showing the embodiment shown in FIG. 1.
Figure 11:
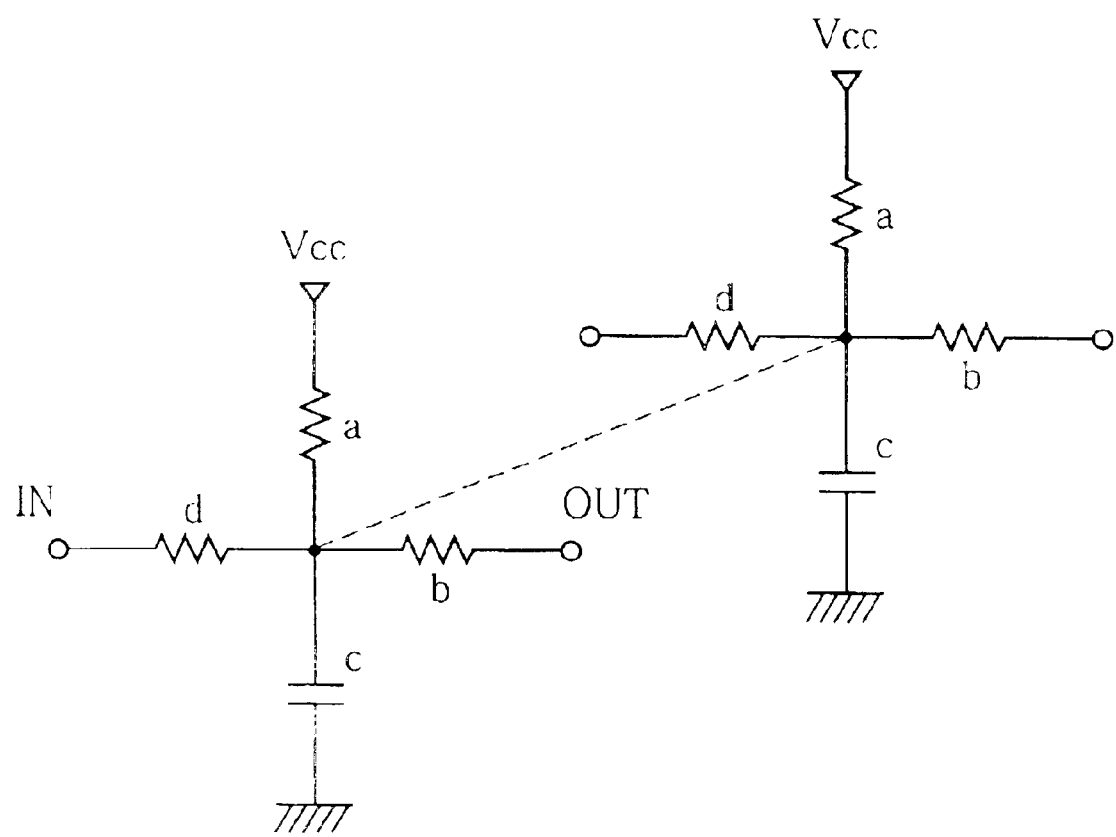
FIG. 11 is an explanatory view showing an example of impedance matching circuits provided by the multiple network electronic component according to the present invention.

Each of the first elements a, the second elements b, the third elements c, and the fourth elements d may be either a resistor or a capacitor, and selection may be made as desired. For example, as shown in FIG. 2, one group of elements (third elements c in the illustrated embodiment) selected from the groups of first elements a, second elements b, third elements c, and fourth elements d are capacitors each having a predetermined capacity. The outer ends of the capacitors are connected to the common wiring pattern 30B which terminates at the terminal electrode (6) for serving as a grounding electrode (E). The remaining groups of elements a, b, d are resistors each having a predetermined resistance. One group of elements (the first elements a in the illustrated embodiment) selected from the remaining groups have their outer ends connected to the common wiring pattern 30A which terminates at the terminal electrode (1) to function as a logic power supply (Vcc). The further remaining groups of resistors b, d are connected individually to the terminal electrodes (2)(3)(4)(5) on one side of the substrate and to the terminal electrodes (7)(8)(9)(10) on the other side of the substrate. Thus, the network electronic component provides such an impedance matching circuit as shown in FIG. 11.

Figure 3:
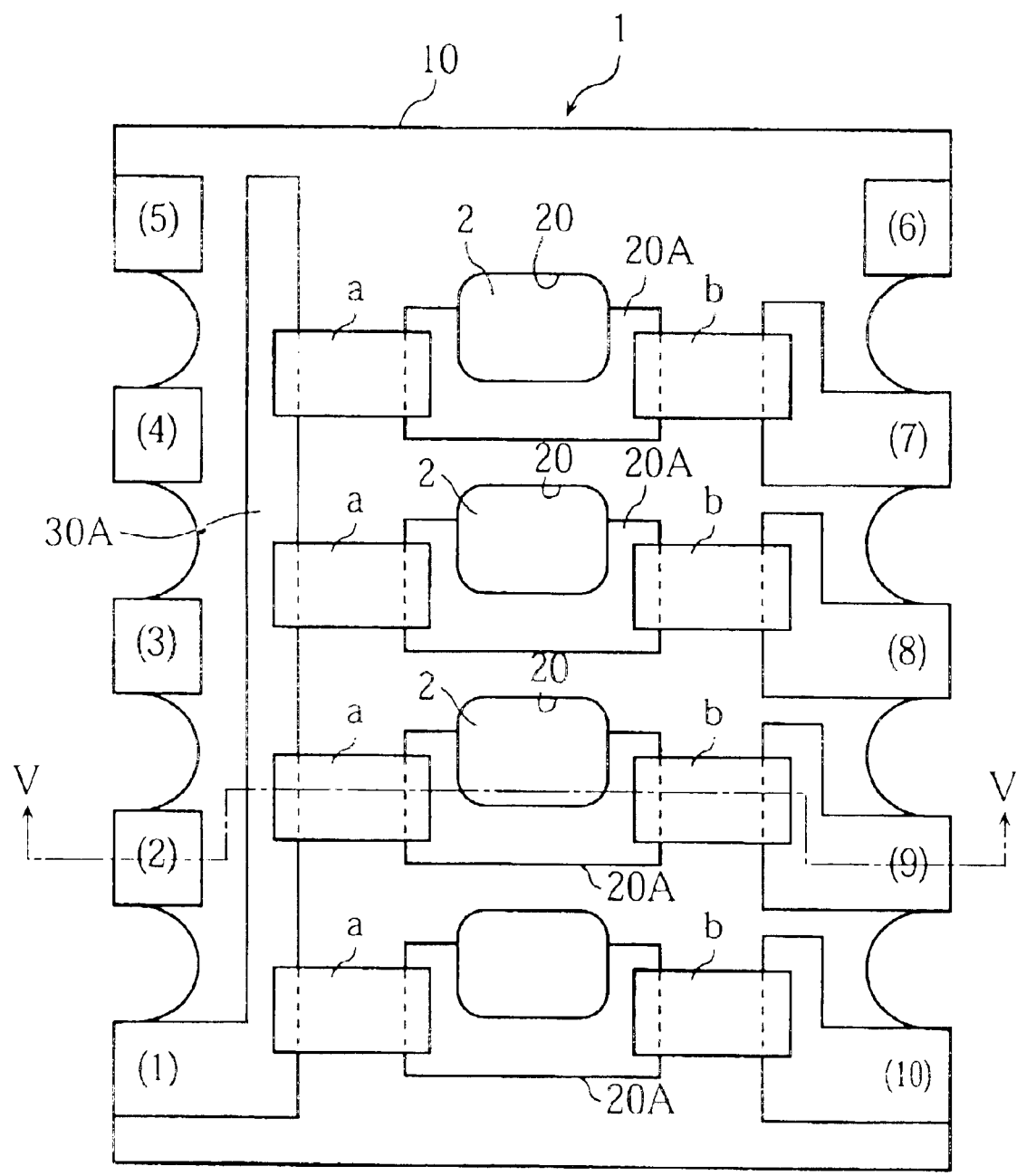
FIG. 3 is a plan view showing a more concrete example of electronic component according to the embodiment shown in FIG. 2.
Figure 4:
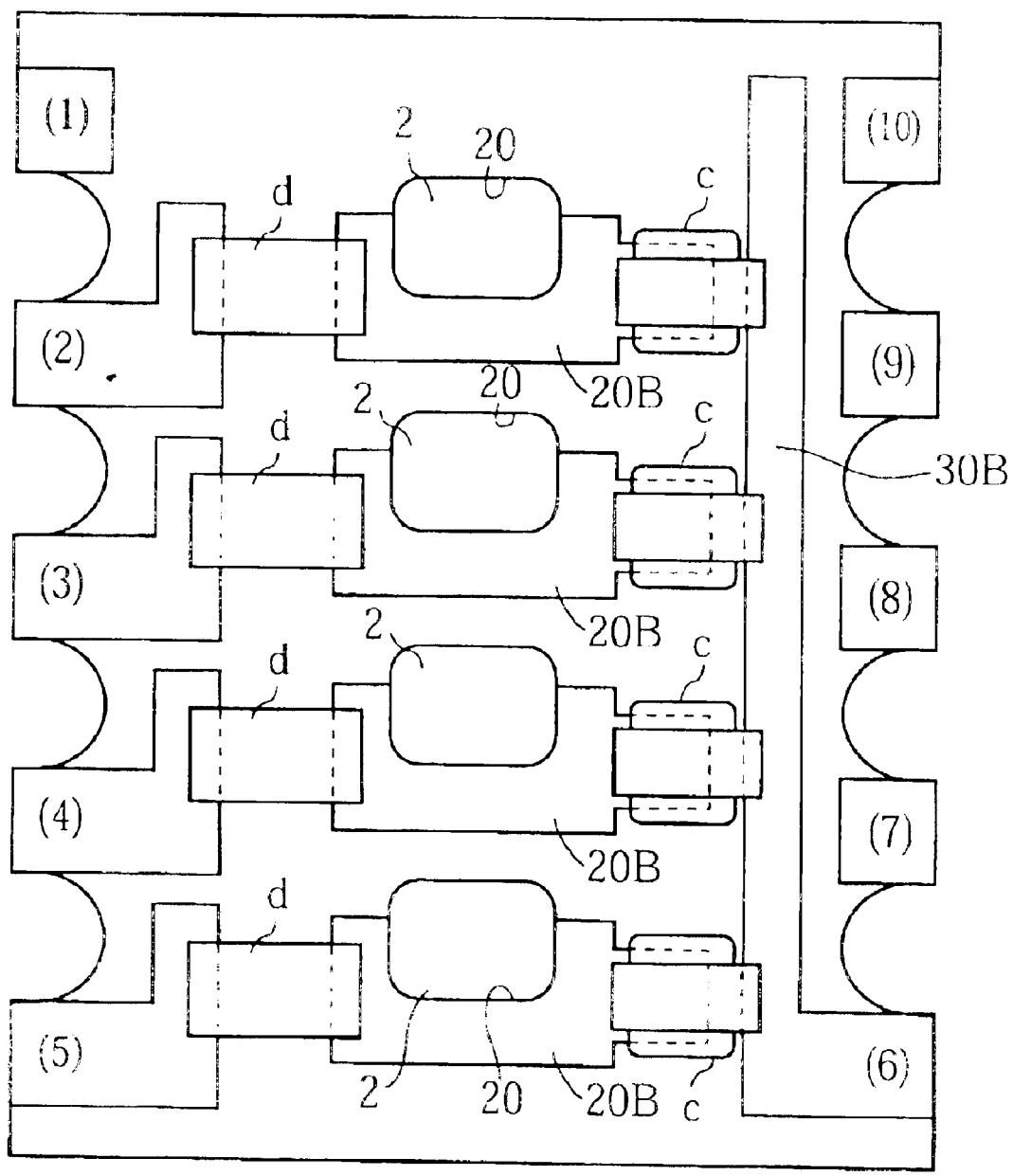
FIG. 4 is a bottom view of the electronic component shown in FIG. 3.
Figure 5:
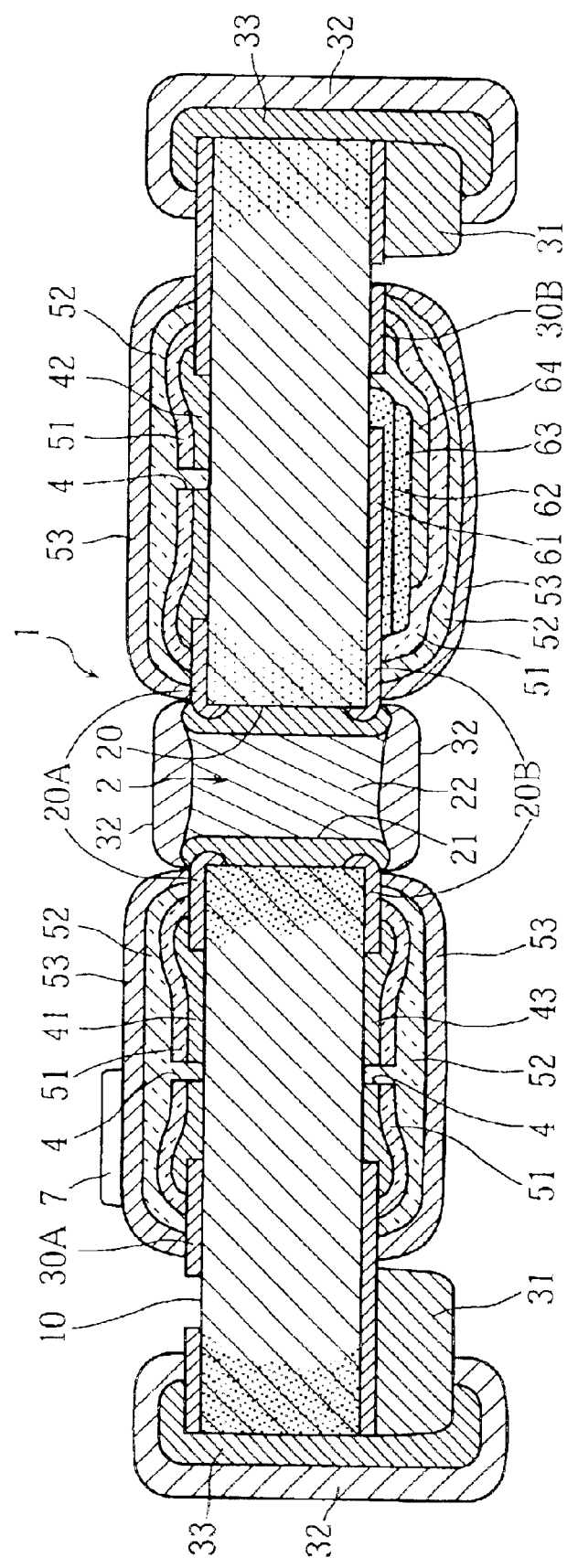
FIG. 5 is an enlarged sectional view taken along lines V—V in FIG. 3.

FIG. 3 is a plan view showing an embodiment having the circuit structure shown in FIG. 2. FIG. 4 is a bottom view of the embodiment, and FIG. 5 is an enlarged sectional view taken along lines V—V in FIG. 3. Note that FIGS. 3 and 4 show only the configuration of the substrate 10, the elements a, b, c, d, the wiring patterns 30A, 30B and the terminal electrodes (1)–(10), but a protective layer and a plating layer covering these components are not shown.

A generally rectangular substrate 10 made of an insulating material such as alumina ceramic has one edge and an opposite edge respectively formed with five projections. These projections are formed with terminal electrodes (1)(2)(3)(4)(5) and terminal electrodes (6)(7)(8)(9)(10). The terminal electrodes are provided by forming a thick conductive film conductor on the upper and lower surfaces of the substrate 10 and side surfaces of the projections, thereby extending over the upper, side, and lower surfaces of the substrate 10. The terminal electrode may be formed, for example, of a silver-containing conductive paste, which is printed or applied and then baked. As shown in FIG. 5, the rear surfaces of the terminal electrodes (1)(2)(3)(4)(5) and the terminal electrodes (6)(7)(8)(9)(10) are formed with a relatively thick laminate block of conductive films 31 to prevent the lower surface of the substrate 10 from coming into unexpected contact with a mother board when mounted. Further, as also shown in FIG. 5, the terminal electrodes (1)(2)(3)(4)(5) and the terminal electrodes (6)(7)(8)(9)(10) are formed with plating layers 32 of nickel and solder, as is generally the case.

The substrate 10 is formed with four through-holes 20 arranged along its center line. Each of first intermediate film conductors 20A and second intermediate film conductors 20B is formed on the upper or lower surface of the substrate 10 in contact with a mouth of a respective one of the through-holes 20 by printing and baking a silver-containing conductive paste for example. As shown in FIG. 5, each of the through-holes 20 has an inner surface to which a silver-containing conductive paste is applied and baked, thereby electrically connecting a respective one of the first intermediate film conductors 20A to a corresponding one of the second intermediate film conductors 20B. The interior of the through-hole 20 is filled with a conductive member 22. Both ends of the conductive member 22 are formed with platings 32 of nickel and solder. Thus, the conductive members 21, 22 filled in the through-hole 20 work as a through-conductive path 2, which may be referred to "via-hole", connecting between the first intermediate film conductor 20A and the second intermediate film conductor 20B which are formed on the upper and lower surfaces of the substrate 10 in opposition to each other. In the illustrated embodiment, since the through-holes 20 is closed, the whole electronic component 1 can be handled by vacuum suction.

Returning now to FIG. 3, a wiring pattern 30A is formed in the form of a strip inwardly from the terminal electrodes (2)(3)(4)(5) on the upper surface of the substrate 10 in one side region thereof by printing and baking a conductive paste. The wiring pattern 30A is connected to the terminal electrode (1). Thick-film resistor elements a (first elements) are formed by printing and baking a resistor paste made of e.g. ruthenium oxide for bridging between the wiring pattern 30A and each of the first intermediate film conductors 20A. Further, thick-film resistor elements b (second elements) are formed on the upper surface of the substrate 10 in the other side region thereof to bridge between each of the terminal electrodes (7)(8)(9)(10) and a respective one of the first intermediate layers 20A.

As shown in FIG. 4, thick-film resistor elements d (fourth elements) are formed on the lower surface of the substrate 10 in one side region thereof to bridge between each of the terminal electrodes (2)(3)(4)(5) and a respective one of the second intermediate film conductors 20B. A wiring pattern 30B is formed in the form of a strip inwardly from the terminal electrodes (7)(8)(9)(10) on the lower surface of the substrate 10 in the other side region thereof by printing and baking a conductive paste. The wiring pattern 30B is connected to the terminal electrode (6). Further, thick-film capacitor elements c (third elements) are formed by a predetermined thick-film forming method for bridging between the wiring pattern 30B and each of the second intermediate film conductors 20B.

As shown in FIG. 5, each of the resistor elements a, b, d includes a resistor coating 41, 42, 43, a glass layer 51 superposed on the resistor coating, and two protective layers 52, 53 further superposed on the glass layer. In the figure, reference numeral 4 represents a laser trimming groove for resistance adjustment. Each of the capacitor elements c includes a lower conductor layer 61 integral with a respective one of the second intermediate film conductors 20B, two dielectric layers 62, 63 superposed on the lower conductor layer, an upper conductor layer 64 superposed on the dielectric layers, a glass layer 51 and two protective layers 52, 53 superposed on the upper conductor layer. Each of the layers forming the elements can be formed by a known thick-film printing method.

The multiple network electronic component having the structure described above can be fabricated by performing the following process steps. Before performing the process steps, an aggregated substrate is prepared which includes a a matrix of unit regions each having a plan view configuration shown in FIG. 3.

<Step 1> Form the first intermediate film conductor 20A, the upper portions of the terminal electrodes (1)–(10), and the wiring pattern 30A collectively on the upper surface of the substrate 10 by printing and baking.

<Step 2> Form the second intermediate film conductors 20B, the lower portions of the terminal electrodes (1)–(10), the lower film conductor 61 for each capacitor element, and the wiring pattern 30B collectively on the lower surface of the substrate 10 by printing and baking.

<Step 3> Form the two dielectric layers 62, 63, the upper film conductor 64, and the glass layer 51 successively on the lower surface of the substrate 10 to provide each capacitor element by printing and baking.

<Step 4> Form the resistors a as the first elements on the upper surface of the substrate 10 by printing and baking.

<Step 5> Form the resistors b as the second elements on the upper surface of the substrate 10 by printing and baking.

<Step 6> Form the resistors c as the third elements on the lower surface of the substrate 10 by printing and baking.

<Step 7> Form the glass layer 51 for covering the resistors a and the resistors b on the upper surface of the substrate 10 by printing and baking.

<Step 8> Form the glass layer 51 for covering the resistors d on the lower surface of the substrate 10 by printing and baking.

<Step 9> Adjust the respective resistance of the resistors a, b, d on the upper and lower surfaces of the substrate 10 by laser trimming via the superposed glass layers 51.

<Step 10> Form the protective layer 52 for covering the resistors d and the capacitor layers c on the lower surface of the substrate 10 by printing and baking.

<Step 11> Form the two protective layers 52, 53 successively for covering the resistors a and the resistors b on the upper surface of the substrate 10 by printing and baking.

<Step 12> Form the final protective layer 53 for covering the resistors d and the capacitor layers c on the lower surface of the substrate 10 by printing and baking.

<Step 13> Form a labeling 7 over the upper surface of the resistor a for example on the upper surface of the substrate 10.

<Step 14> Form each film conductor 31 in the form of a block on the lower surface of the substrate 10 by printing and baking.

<Step 15> Form the film conductor 21 on the inner surface of each through-hole, followed by filling the through-hole 20 with the conductive member 22.

<Step 16> Divide the aggregated substrate into strip substrates each including a row of unit regions each of which corresponds to the one shown in FIG. 3.

<Step 17> Form an electrode film 33 on the side surface of each projection at edges of the substrate 10 by printing and baking.

<Step 18> Divide each strip substrate into a plurality of chips.

<Step 19> Form the platings 32 on the terminal electrodes (1)–(10) at both ends of the through-conductive paths 20.

In this way, a simple method such as a thick-film printing method may be used to form elements, wirings and the like on both surfaces of the single substrate 10 for providing a multiple network electronic component having the above-described structure which, as shown in FIG. 11, includes a plurality of side-by-side sets of crosswise-connected four elements.

Figure 6:
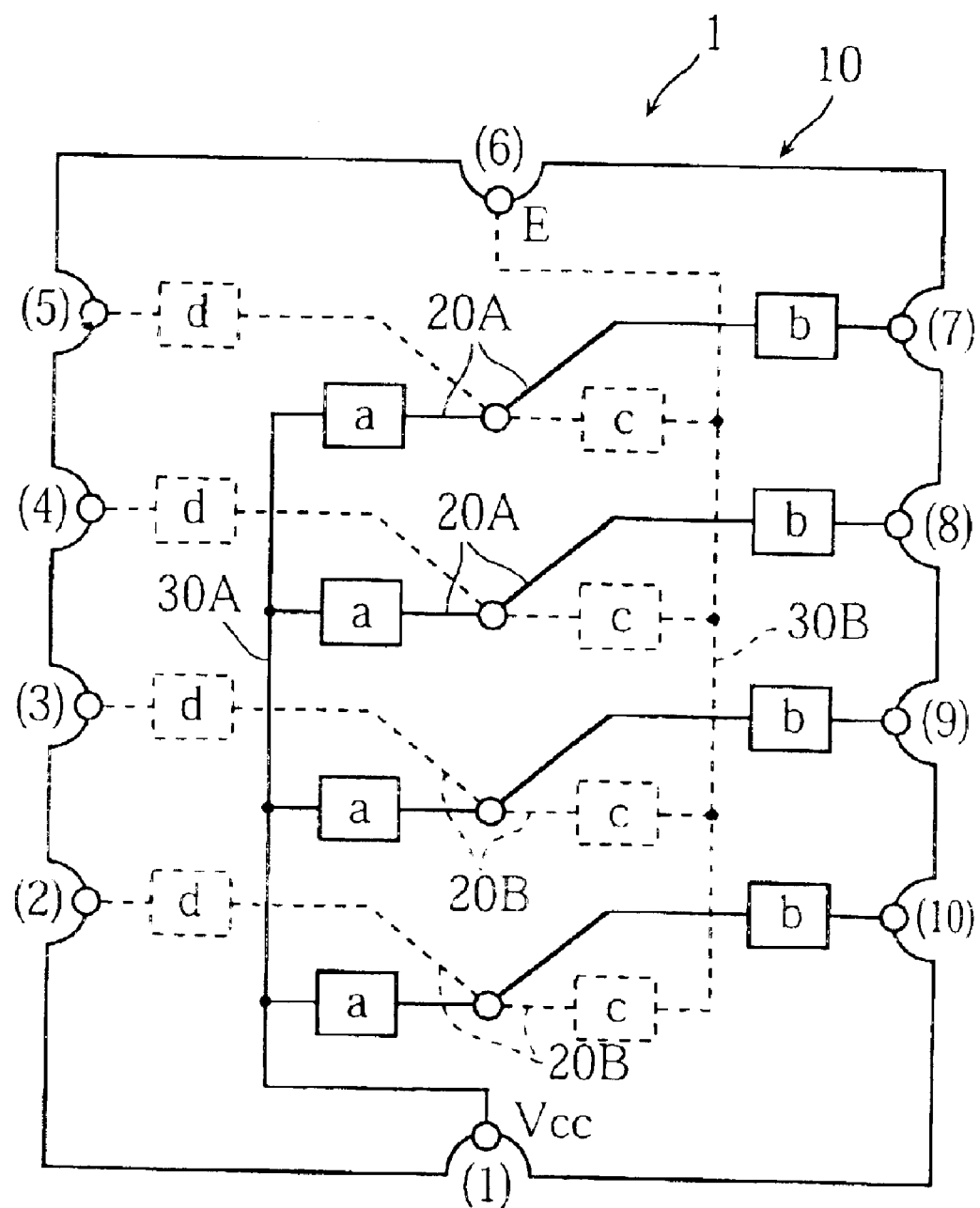
FIG. 6 is a schematic plan view showing a multiple network electronic component according to another embodiment of the present invention.

FIG. 6 is a plan view showing a multiple network electronic component 1 according to another embodiment of the present invention. As in FIG. 1, the wiring pattern and the elements formed on the upper surface of the substrate 10 are represented in solid lines while the wiring pattern and the elements formed on the lower surface of the substrate 10 are represented in dotted lines. A difference from the structure shown in FIG. 1 resides in that the terminal electrodes (2)–(5), (7)–(10) are formed at recesses on both side edges of the substrate 10. Another difference is that the terminal electrodes (1)(6) are provided at recesses on longitudinally spaced edges of the substrate for connection to the wiring pattern 30A connected commonly to the outer ends of the first elements a, and to the wiring pattern 30B connected commonly to the outer ends of the third elements c. The remaining features are identical with those shown in FIG. 1. Obviously, such a structure also provides the same function as the structure shown in FIG. 1.

Figure 7:
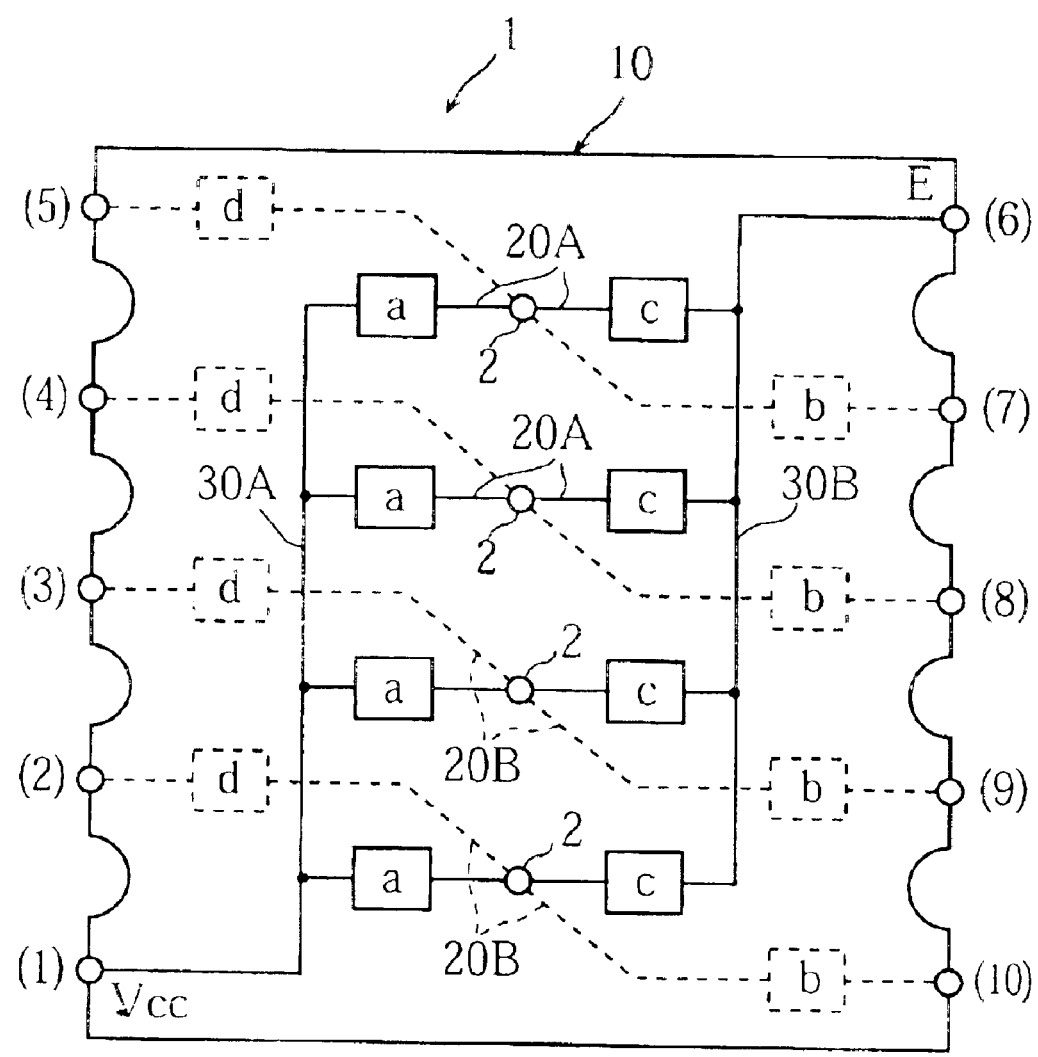
FIG. 7 is a schematic plan view showing a multiple network electronic component according to still another embodiment of the present invention.

FIG. 7 is a plan view showing a multiple network electronic component 1 according to still another embodiment of the present invention. As in FIG. 1, the wiring pattern and the elements formed on the upper surface of the substrate 10 are represented in solid lines while the wiring pattern and the elements formed on the lower surface of the substrate 10 are indicated in dotted lines. A difference from the structure shown in FIG. 1 resides in that the third elements c whose outer ends are commonly connected to the wiring pattern 30B are formed on the upper surface of the substrate 10 instead of the second elements b, whereas the second elements b whose outer ends are connected individually to the terminal electrodes (7)(8)(9)(10) are formed on the lower surface of the substrate 10 instead of the third elements c. Electrically considered, such a structure provides the same function as the structure shown in FIG. 1.

Figure 8:
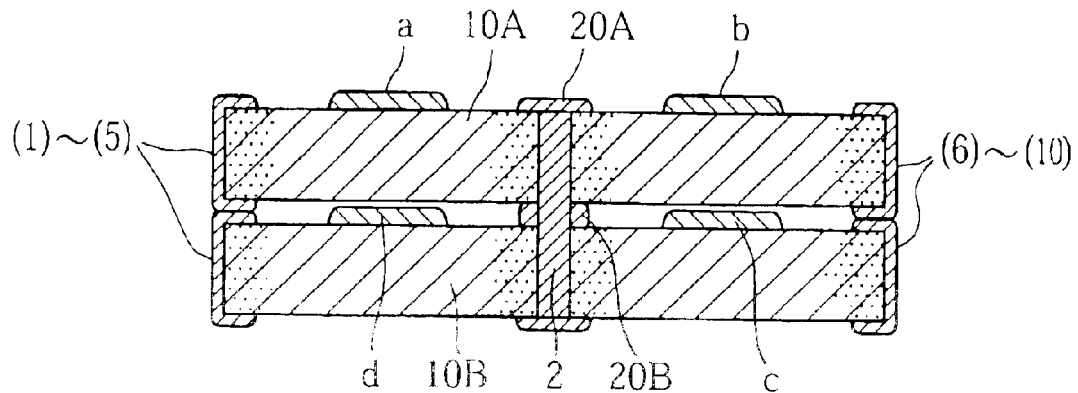
FIG. 8 is a sectional view showing an example of layout in forming a first element-forming surface and a second element-forming surface.
Figure 9:
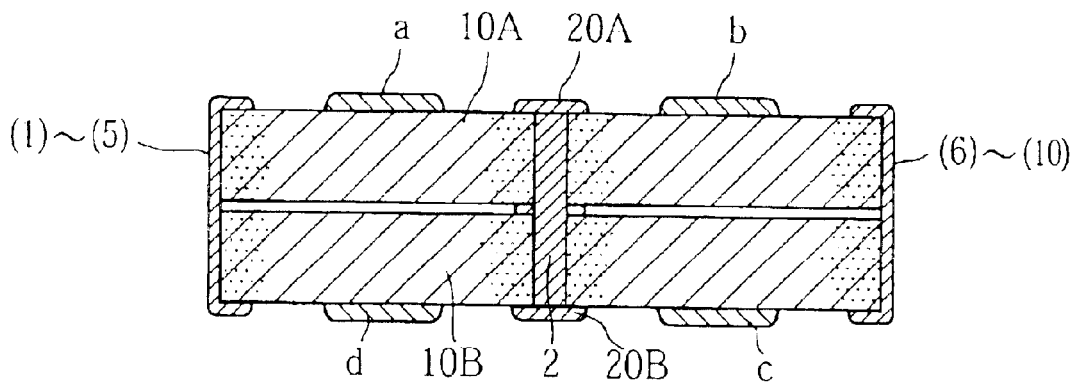
FIG. 9 is a sectional view showing another example of layout in forming a first element-forming surface and a second element-forming surface.
Figure 10:
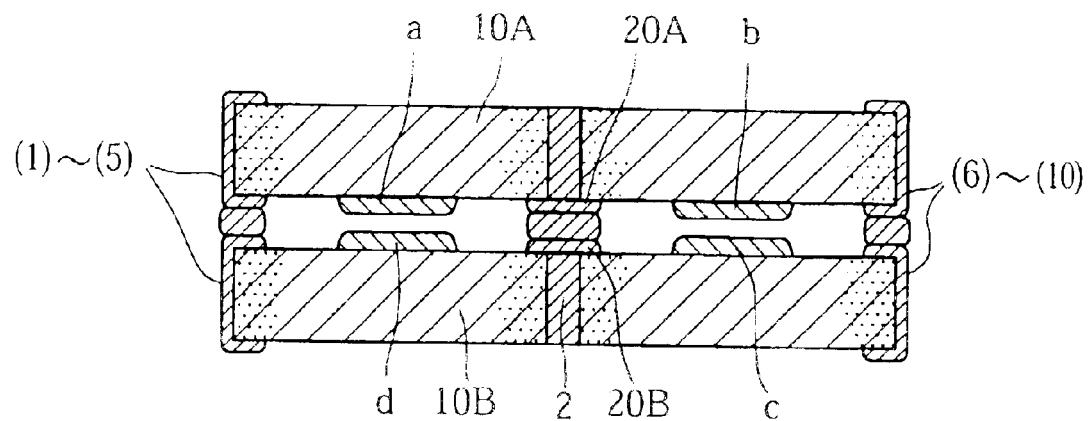
FIG. 10 is a sectional view showing a further example of layout in forming a first element-forming surface and a second element-forming surface.

In the embodiments described above, the first element-forming surface and the second element-forming surface are formed on the upper and lower surfaces of the single substrate 10. However, the present invention only requires that the first element-forming surface and the second element-forming surface are spaced from each other thicknesswise of the insulator. Accordingly, as shown in FIG. 8, the elements and the wiring patterns may be formed on the upper surface of a first substrate 10A in the same layout as in FIG. 3 while the elements and the wiring patterns may be formed on an upper surface of a second substrate 10B in the same layout as in FIG. 4, superposing the first substrate 10A over the second substrate 10B with their upper surfaces directed upward. With this arrangement, the first intermediate film conductors 20A on the first substrate 10A and the second intermediate film conductors 20B on the second substrate 10B may be electrically connected by the via-holes 2 formed in the first substrate 10A for example. Further, as shown in FIG. 9, the first substrate 10A and the second substrate 10B may be superposed back to back. Alternatively, as shown in FIG. 10, the first substrate 10A and the second substrate 10B may be superposed in a manner such that their element-forming surfaces face each other. In these cases, the first intermediate film conductors 20A and the second intermediate film conductors 20B can also be electrically connected by the via-holes 2 or the like.

In addition, the term "elements" as used for the description of the present invention includes not only resistors and capacitors but also jumpers utilized only for establishing electrical connection. When one of each first element a, each second element b, each third element c, and each fourth element d is such a jumper, there is virtually provided a network component in which a plurality of side-by-side circuits each including T-connected three elements.

Of course, the present invention is not limited to the embodiments described above. For example, the above-described production steps for a multiple network electronic component may be modified with respect to their order. Further, necessary conductive patterns may be formed on an aggregate substrate by performing <Step 1> and <Step 2> followed by formation of via-holes at desired positions, and the remaining steps may be performed with respect to the aggregated substrate, thereby efficiently producing electronic components according to the present invention.

What is claimed is:

1. A multiple network electronic component comprising:
    an insulator having a first element-forming surface and a second element-forming surface spaced thicknesswise from the first element-forming surface, a plurality of first intermediate film conductors formed on the first element-forming surface and spaced from each other, a plurality of second intermediate film conductors formed on the second element-forming surface and spaced from each other in corresponding relation to the first intermediate film conductors, and a plurality of through-conductive paths penetrating the insulator for electrically connecting each of the first intermediate film conductors to a corresponding one of the second film conductors;
    wherein the first element-forming surface is formed with a plurality of first elements and a plurality of second elements, each of the first and second elements having one end connected to a respective one of the first intermediate film conductors; and
    wherein the second element-forming surface is formed with a plurality of third elements and a plurality of fourth elements, each of the third and fourth elements having one end connected to a respective one of the second intermediate film conductors.

2. The multiple network electronic component according to claim 1, either or all of the first intermediate film conductors, the second intermediate film conductors, the first elements, the second elements, the third elements, and the fourth elements are formed by thick-film printing.

3. The multiple network electronic component according to claim 1, wherein one of each first element, each second element, each third element, and each fourth element connected to the common film conductor is a jumper element.

4. The multiple network electronic component according to claim 1, wherein the first element-forming surface is provided by an upper surface of a single insulating substrate, the second element-forming surface being provided by a lower surface of the substrate.

5. The multiple network electronic component according to claim 1, wherein the first element-forming surface is provided by one surface of a first insulating substrate while the second element-forming surface is provided by one surface of a second insulating substrate, the first insulating substrate and the second insulating substrate being laminated together.

6. The multiple network electronic component according to claim 2, the first intermediate film conductors and the second intermediate film conductors are formed along a center line of the insulator, the first elements and the fourth elements being formed on one side of the insulator while the second elements and the third elements are formed on opposite side of the insulator.

7. The multiple network electronic component according to claim 5, wherein the first insulating substrate and the second insulating substrate are laminated on each other with the first element-forming surface and the second element-forming surface directed in a same direction.

8. The multiple network electronic component according to claim 5, wherein the first insulating substrate and the second insulating substrate are laminated on each other with the first element-forming surface and the second element-forming surface directed away from each other.

9. The multiple network electronic component according to claim 5, wherein the first insulating substrate and the second insulating substrate are laminated on each other with the first element-forming surface and the second element-forming surface directed toward each other.

10. The multiple network electronic component according to claim 6, one of each first element and each fourth element has another end connected individually to a respective one of plural terminal electrodes formed at one edge of the insulator while the other of each first element and each fourth element is connected to a common film conductor which is connected to a terminal electrode formed at said one edge of the insulator; and
    wherein one of each second element and each third element has another end connected individually to a respective one of plural terminal electrodes formed at an opposite edge of the insulator while the other of each second element and each third element is connected to a common film conductor which is connected to a terminal electrode formed at said opposite edge of the insulator.

11. The multiple network electronic component according to claim 10, wherein each of the through-conductive paths has a cross-sectional area which is smaller than a surface area of the respective first or second intermediate film conductor.

12. The multiple network electronic component according to claim 10, wherein one of each first element, each second element, each third element, and each fourth element connected to the common film conductor is a capacitor, the remaining elements being resistors.

* * * * *